US012630221B2

(12) United States Patent
Tanaka et al.

(10) Patent No.: US 12,630,221 B2
(45) Date of Patent: May 19, 2026

(54) TRAVEL ASSISTANCE METHOD AND TRAVEL ASSISTANCE DEVICE

(71) Applicants:Nissan Motor Co., Ltd., Yokohama (JP); Renault S.A.S., Boulogne-Billancourt (FR)

(72) Inventors: Shinya Tanaka, Kanagawa (JP); Hirotoshi Ueda, Kanagawa (JP)

(73) Assignees: Nissan Motor Co., Ltd., Yokohama (JP); Renault S.A.S., Boulogne-Billancourt (FR)

( * ) Notice: Subject to any disclaimer, the term of this patent is extended or adjusted under 35 U.S.C. 154(b) by 154 days.

(21) Appl. No.: 18/693,788

(22) PCT Filed: Sep. 23, 2021

(86) PCT No.: PCT/IB2021/000671
§ 371 (c)(1),
(2) Date: Mar. 20, 2024

(87) PCT Pub. No.: WO2023/047148
PCT Pub. Date: Mar. 30, 2023

(65) Prior Publication Data
US 2024/0326910 A1      Oct. 3, 2024

(51) Int. Cl.
*B62D 15/02*      (2006.01)
*B60W 30/095*      (2012.01)

(52) U.S. Cl.
CPC ....... *B62D 15/0265* (2013.01); *B60W 30/095* (2013.01)

(58) Field of Classification Search
CPC ............ B62D 15/0265; B60W 30/095; B60W 30/0953; B60W 30/18163;
(Continued)

(56) References Cited

U.S. PATENT DOCUMENTS

| 2018/0233049 | A1* | 8/2018 | Ishii ........................ G08G 1/162 |
| 2019/0283740 | A1* | 9/2019 | Toda ........................ G06F 16/29 |
| 2022/0242403 | A1 | 8/2022 | Horita et al. |

FOREIGN PATENT DOCUMENTS

| JP | 2015-057688 A | 3/2015 |
| JP | 2020-052673 A | 4/2020 |

(Continued)

*Primary Examiner* — Scott A Reinbold
(74) *Attorney, Agent, or Firm* — Young Basile Hanlon & MacFarlane, P.C.

(57) ABSTRACT

A travel assistance device includes a traveling boundary acquisition unit configured to acquire lane information around a subject vehicle, a surrounding object acquisition unit configured to acquire surrounding object information, an obstacle determination unit configured to determine whether an obstacle hindering travel of the subject vehicle is present, an avoidance determination unit configured to determine whether the subject vehicle is allowed to avoid the obstacle by a steering control, and a blind spot determination unit configured to determine whether a blind spot is present on an oncoming lane opposed to a travel direction. An avoidance section setting unit is configured to set an avoidance end position of an avoidance section to execute an avoidance control. A vehicle control unit is configured to generate a travel route for the subject vehicle to travel from an avoidance start position to the avoidance end position of the avoidance section.

13 Claims, 7 Drawing Sheets

(58) Field of Classification Search
  CPC ......... B60W 60/0015; B60W 2552/00; B60W
         2552/30; B60W 2552/53; B60W 2556/40;
         B60W 30/09; B60W 30/0956; B60W
                        40/02; B60W 60/00
  USPC .......................................................... 701/41
  See application file for complete search history.

(56) References Cited

FOREIGN PATENT DOCUMENTS

| | | |
|---|---|---|
| JP | 2020-163968 A | 10/2020 |
| JP | 2020-194309 A | 12/2020 |
| JP | 2021-011167 A | 2/2021 |

* cited by examiner

TRAVEL ASSISTANCE METHOD AND TRAVEL ASSISTANCE DEVICE

TECHNICAL FIELD

The present invention relates to a travel assistance method and a travel assistance device.

BACKGROUND

There is known a technique for generating a driving path between virtual obstacles. When a traveling avoidance region is set for a subject vehicle to avoid traveling, the technique sets a traveling region for traveling avoiding the traveling avoidance region and sets a virtual obstacle at the traveling avoidance region and the opposite side of the traveling avoidance region across the traveling region for generating the driving path (see JP 2015-057688 A).

SUMMARY

When there is a blind spot area as a blind spot from a subject vehicle on an oncoming lane in a travel direction of the subject vehicle, there is a possibility that a moving object on the oncoming lane enters a travel route generated for avoidance of the subject vehicle from the blind spot area. However, since the technique of JP 2015-057688 A does not consider the blind spot area on the oncoming lane in the travel direction of the subject vehicle, there is a problem of not being able to generate an appropriate travel route according to the blind spot area.

A problem to be solved by the present invention is to provide a travel assistance method and a travel assistance device capable of generating an appropriate travel route according to the blind spot area as the blind spot from the subject vehicle on the oncoming lane in the travel direction of the subject vehicle when generating a travel route for avoiding a traveling avoidance region.

The present invention solves the above-described problem by acquiring lane information around a subject vehicle; acquiring surrounding object information about an object around the subject vehicle; determining whether or not an obstacle hindering a travel of the subject vehicle on a subject lane where the subject vehicle travels is present, based on the lane information and the surrounding object information; determining whether or not the subject vehicle is allowed to avoid the obstacle by a steering control in an avoidance direction to avoid the obstacle based on the lane information when determining that the obstacle is present; determining whether or not a blind spot area as a blind spot from the subject vehicle is present on an oncoming lane opposed to a travel direction of the subject vehicle when determining the subject vehicle is allowed to avoid the obstacle, the blind spot area being located in the avoidance direction with respect to the subject lane; setting an avoidance end position of an avoidance section to execute an avoidance control including the steering control in the avoidance direction according to a result of the determination of whether or not the blind spot area is present; and generating a travel route for the subject vehicle to travel from an avoidance start position to the avoidance end position of the avoidance section.

The present invention allows generating an appropriate travel route according to the blind spot area as the blind spot from the subject vehicle on the oncoming lane in the travel direction of the subject vehicle when generating a travel route for avoiding a traveling avoidance region.

DETAILED DESCRIPTION

Figure 1:
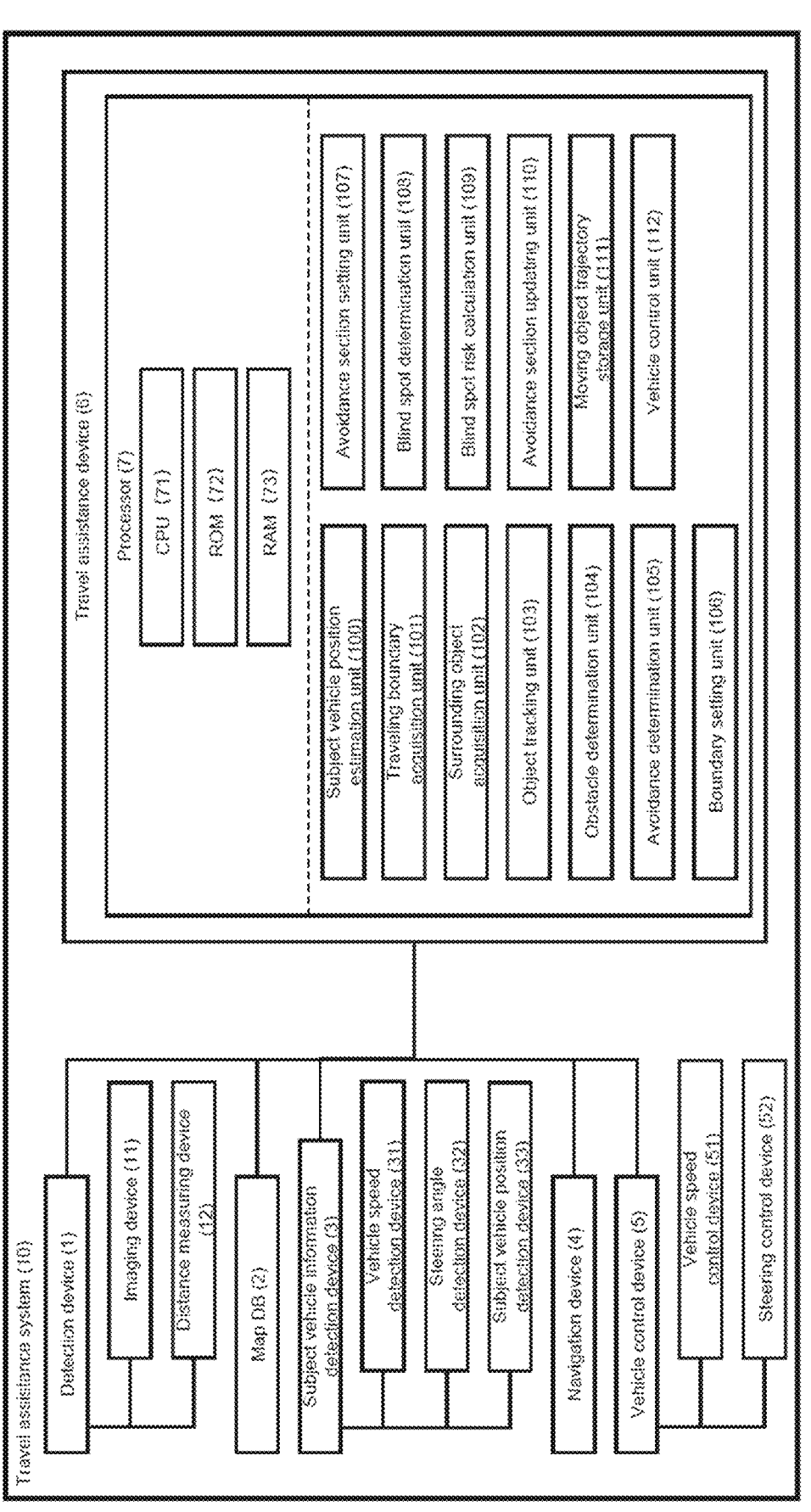
FIG. 1 is a diagram illustrating an exemplary configuration of a travel assistance system according to the present embodiment.

An embodiment of a travel assistance device according to the present invention will be described with reference to the drawings. A configuration of the travel assistance device according to the present embodiment will be described with reference to FIG. 1. FIG. 1 is a block diagram illustrating a travel assistance system 10 including a travel assistance device according to the present invention.

As shown in FIG. 1, the travel assistance system 10 includes a detection device 1, a map DB2, a subject vehicle information detection device 3, a navigation device 4, a vehicle control device 5, and a travel assistance device 6. The detection device 1 includes an imaging device 11 and a distance measuring device 12. The subject vehicle information detection device 3 includes a vehicle speed detection device 31, a steering angle detection device 32, and a subject vehicle position detection device 33. The vehicle control device 5 includes a vehicle speed control device 51 and a steering control device 52. The devices included in the travel assistance system 10 are connected by a controller area network (CAN) or another in-vehicle LAN, and can exchange information one another.

The travel assistance system 10 according to the present invention can be applied not only to traveling of a vehicle by an autonomous travel control but also to assisting traveling of a vehicle by manual driving of a driver. In addition, when the travel assistance system 10 is applied to the autonomous travel control of the vehicle, the travel assistance system 10 can be applied to autonomous control of both the speed control and the steering control, and also to autonomous control of one of the speed control and the steering control and the manual control of the other.

In the following description, it is assumed that the vehicle travels on the left side in a country having the left-side traffic regulations. In a country having right-side traffic regulations, since the vehicle travels on the right side, the right and left sides of the following description are symmetrical and interpreted.

The detection device 1 is a sensor for detecting an object around a subject vehicle. Objects are, for example, lane boundary lines of roads, buffer zones of zebra zone, center-lines, road indicators, central separation zones, guardrails, curbstones, sidewalls of expressway, road signs, traffic sig-nals, crosswalks, construction sites, crash sites, and traffic restrictions. Further, the object includes a vehicle (another vehicle) other than the subject vehicle, motorcycles, bicycles, and pedestrians. The object also includes obstacles that possibly affect a travel of the subject vehicle. The detection device 1 acquires a position, an attitude (a pos-ture), and a velocity of a detected moving object.

The object is detected, for example, by the imaging device 11 and/or the distance measuring device 12. Detection results of the imaging device 11 and the distance measuring device 12 are acquired by the travel assistance device 6 at predetermined intervals. The imaging device 11 is a device that recognizes objects around the subject vehicle by images, and is a camera or the like. A plurality of the imaging devices 11 may be provided in one vehicle.

The distance measuring device 12 is a device for calcu-lating a relative distance and a relative velocity between a vehicle and an object, and is, for example, a laser radar. A plurality of the distance measuring devices 12 may be provided in one vehicle.

The map DB2 is a HD map in which a road structure including lanes and road surface displays presenting a destination is described. The map DB2 is a database con-taining information used for generating and/or driving con-trol of a travel route. The map DB2 includes two-dimen-sional position information and/or three-dimensional position information in each map coordinate, road informa-tion in each map coordinate, boundary information of a lane, road attribute information, lane inbound/outbound informa-tion, lane identification information, connection destination lane information, facility information, and attribute infor-mation thereof. The road information includes information such as a road width, a radius of curvature, a road shoulder structure, traffic regulations (speed limit, lane change avail-ability), a merging point of a road, a branching point, and an increase/decrease position of the number of lanes. The map DB2 is stored in a readable manner in a recording medium provided in the travel assistance device 6, an in-vehicle device, or a server device.

In addition, the map DB2 includes the lane boundary information indicating a boundary between the lane on which subject vehicle travels and another lane. The lane boundaries are present on the left and right sides of a travel direction of the subject vehicle. A form of the lane boundary is not particularly limited, and examples thereof include road markings and road constructions. Examples of the lane boundary of the road markings include a lane boundary line and a centerline. The traveling path boundary of the road constructions may be, for example, a central separation zone, a guardrail, a curbstone, a tunnel, or a side wall of an expressway. Note that for a point where a lane boundary cannot be clearly identified (for example, within an inter-section), a lane boundary is set in advance in the map DB2. The preset lane boundary is an imaginary traveling path boundary and is not road markings or road constructions actually present.

The subject vehicle information detection device 3 is a device that detects information about a state of the subject vehicle. The state of the subject vehicle includes a traveling speed, an acceleration, a steering angle, a position, an attitude, and the like of the subject vehicle. The traveling speed and the acceleration are detected using the vehicle speed detection device 31. The steering angle is detected using the steering angle detection device 32. The present position is calculated based on information acquired from the subject vehicle position detection device 33. The attitude is detected using an inertial measurement unit (IMU). The travel assistance device 6 acquires the detection results of these devices via the in-vehicle LAN as needed.

The vehicle speed detection device 31 is not particularly limited as long as it is a sensor capable of detecting a traveling speed of the vehicle, and any known sensor can be used. Similarly, the steering angle detection device 32 is not particularly limited as long as it is a sensor capable of detecting a steering angle of the vehicle. Alternatively, the traveling speed and the steering angle of the subject vehicle may be acquired from the vehicle control device 5. The subject vehicle position detection device 33 is a positioning device including a GPS unit and the like, and is not particularly limited, and a known device can be used.

The navigation device 4 is a device that refers to the map DB2 and calculates a travel route from the present position of the subject vehicle detected by the subject vehicle posi-tion detection device 33 of the subject vehicle information detection device 3 to the destination set by the driver. The calculated travel route is outputted to the travel assistance device 6. The travel route is a linear path that specifies a road, a direction (inbound/outbound), and a lane along which the subject vehicle travels. The travel route includes information on a travel lane.

The vehicle control device 5 is an in-vehicle computer such as an electronic control unit (ECU), and electronically controls the in-vehicle devices that control the traveling of the vehicle. The vehicle control device 5 includes the vehicle speed control device 51 that controls the traveling speed of the subject vehicle and the steering control device 52 that controls the steering operation of the subject vehicle.

The vehicle speed control device 51 controls driving devices, such as an electric motor and/or an internal com-bustion engine as a traveling driving source, an automated transmission, and the like. The vehicle speed control device 51 autonomously controls the traveling velocity of the vehicle based on a control signal inputted from the travel assistance device 6.

The steering control device 52 controls a steering device. The steering control device 52 autonomously controls opera-tion of the steering device such that the subject vehicle travels while maintaining a predetermined lateral position (a position in the left-right direction of the vehicle) with respect to the set travel route by using at least one of the detection result of the detection device 1, the map DB2, and the own vehicle information acquired by the subject vehicle information detection device 3, based on the control signal inputted from the travel assistance device 6.

The travel assistance device 6 is a device that controls and cooperates with the devices included in the travel assistance system 10 to control the travel of the subject vehicle, and assists the travel of the subject vehicle, in particular, the avoidance control that avoids the obstacle that hinders the subject vehicle from traveling on the subject lane. The obstacle is an object that cannot be avoided unless the subject vehicle strays into an adjacent lane or a buffer zone in the left or right direction of the subject lane. The obstacle is a stationary object on the subject lane, and is, for example, a parked vehicle, a construction sign, or the like. In the present embodiment, the travel assistance device 6 sets an avoidance section for executing the avoidance control including the steering control in the avoidance direction for avoiding the obstacle. Then, in the avoidance section, the travel assistance device 6 executes the avoidance control for avoiding the obstacle through the adjacent lane or the buffer zone in either the left or right direction with respect to the subject lane. The avoidance section is a section along the travel direction of the subject lane, from the avoidance start position at which the subject vehicle starts the avoidance control to the avoidance end position at which the subject vehicle ends the avoidance control.

Figure 2A:
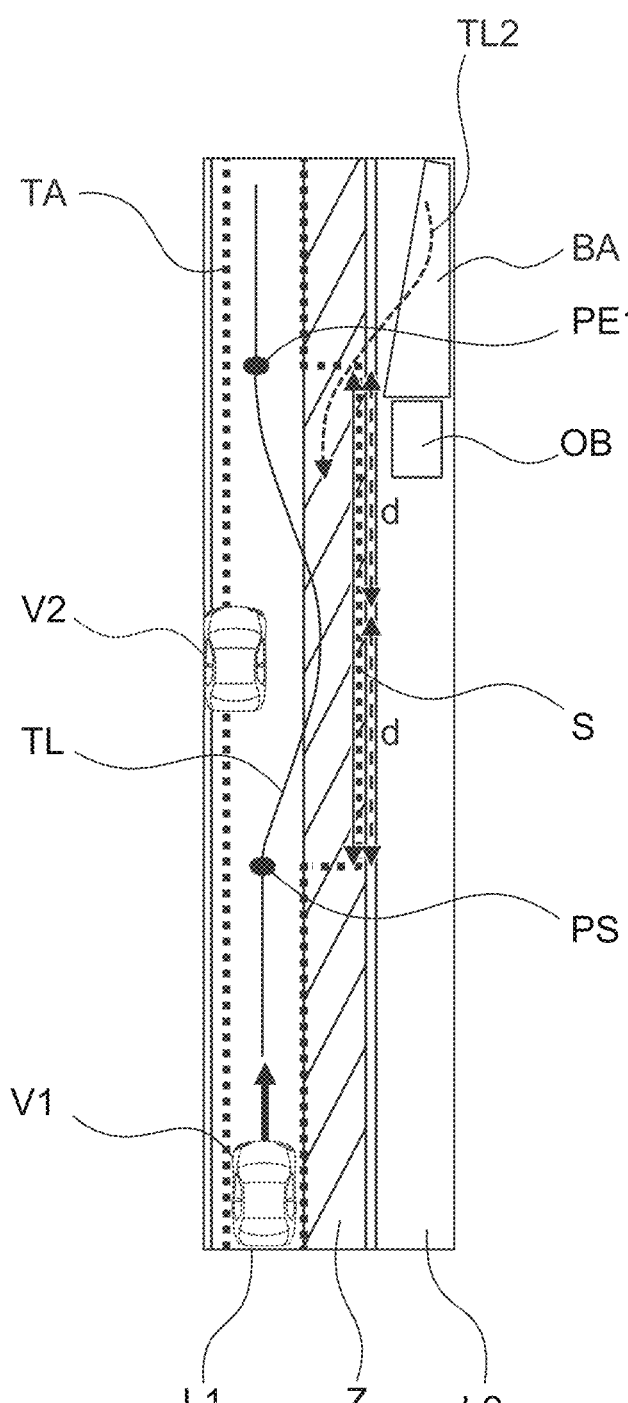
FIG. 2A is an exemplary situation in which the avoidance support control according to the present embodiment is executed.
Figure 2B:
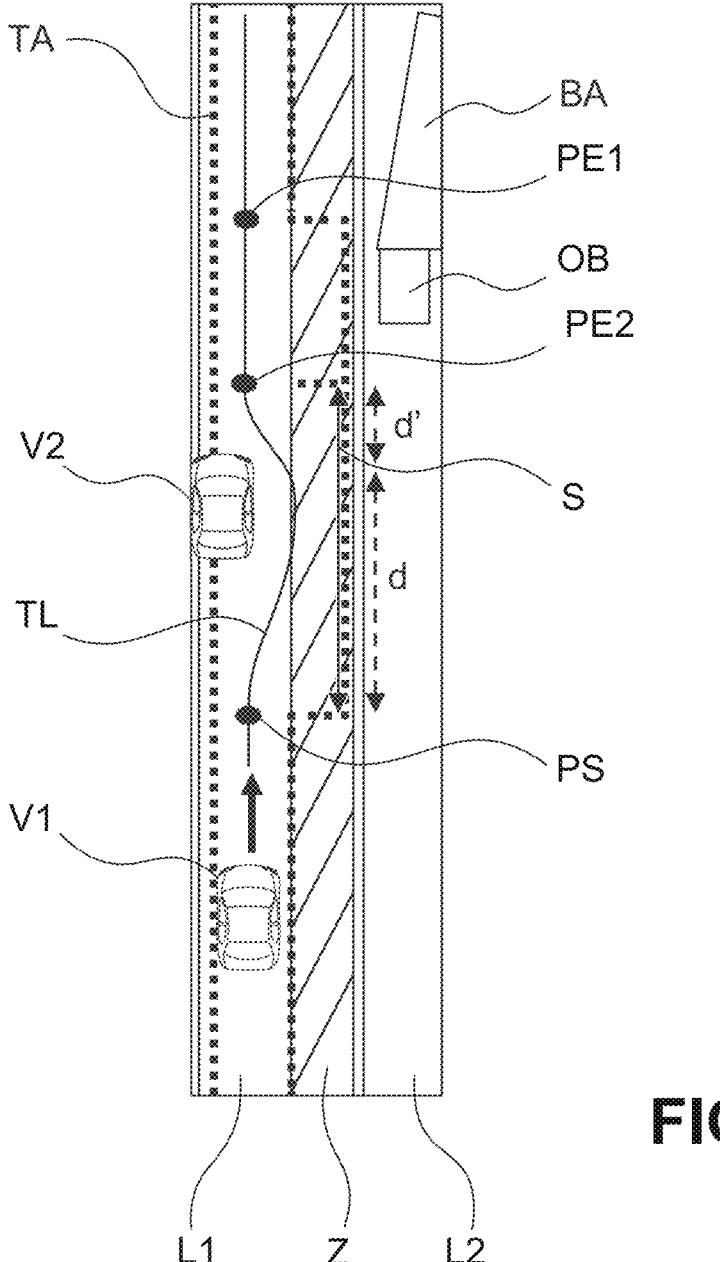
FIG. 2B is an exemplary situation in which the avoidance support control according to the present embodiment is executed.
Figure 2C:
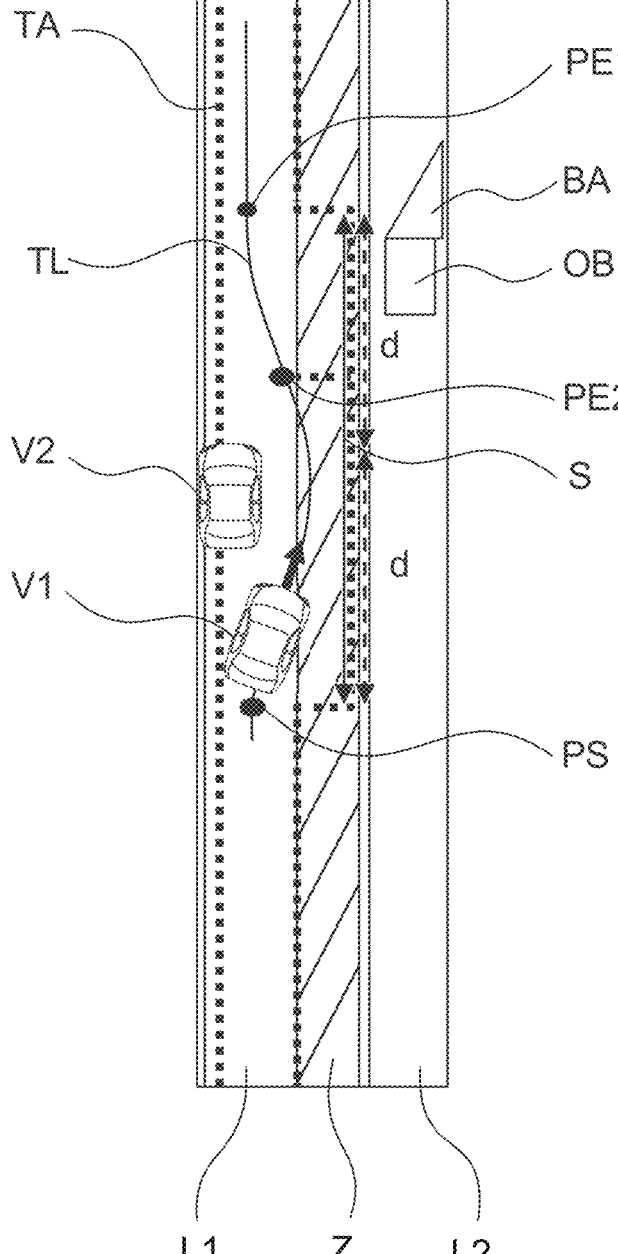
FIG. 2C is an exemplary situation in which the avoidance support control according to the present embodiment is executed.

The following description will be made for a situation in which the subject vehicle executes the avoidance control to avoid the obstacle on the subject lane. FIGS. 2A to 2C are diagrams illustrating situations in which the subject vehicle executes the avoidance control for avoiding the parked vehicle on the subject lane. In FIG. 2A, when a vehicle V1 is approaching a parked vehicle V2 on a subject lane L1, the travel assistance device 6 sets an avoidance section S to avoid the parked vehicle V2. The avoidance section S is a section from an avoidance start position PS to an avoidance end position PE1 along the travel direction of the subject vehicle. Then, the travel assistance device 6 extends a travelable area TA on which the subject vehicle V1 can travel to a buffer zone Z adjacent to the subject lane L1. At this time, a length of an expansion part of the travelable area TA extended on the buffer zone corresponds to the avoidance section S. The travel assistance device 6 generates a travel route TL for the avoidance control in the avoidance section S. The travel route TL is a path in which the subject vehicle V1 starts the avoidance control from the avoidance start position PS, travels in the travelable area TA extended on the buffer zone Z, and reaches the avoidance end position PE1 on the subject lane L1. Note that the avoidance start position PS and the avoidance end position PE1 in the widthwise direction of the lane are, for example, positions on the center line of the subject lane.

Also, in FIG. 2A, on an oncoming lane L2 adjacent to the buffer zone Z, there is a blind causing object OB that causes a blind spot, and the blind causing object OB causes a blind spot area BA to occur on the oncoming lane L2 as a blind spot from the subject vehicle V1. A moving object could be in the blind spot area BA and could enter the avoidance section S on the buffer zone Z from the blind spot area BA during the avoidance control of the vehicle V1. For example, the moving object moving on the oncoming lane could travel through a trajectory TL2 to avoid the blind causing object OB. Therefore, the driver feels a sense of fear for the blind spot area BA. In the present embodiment, as described below, when the subject vehicle executes the avoidance control, an appropriate travel route corresponding to the blind spot area on the oncoming lane is generated. This can reduce the driver's fear of the blind spot area.

FIG. 2B illustrates a situation t seconds after the situation of FIG. 2A in which the travel assistance device 6 detects the blind causing object OB located on the oncoming lane L2 around the avoidance section S. In such a situation, the travel assistance device 6 calculates a blind spot risk indicating a possibility that the moving object moving on the oncoming lane enters the avoidance section S from the blind spot area BA. In response to the blind spot risk, the travel assistance device 6 updates the avoidance end position of the avoidance section S from the avoidance end position PE1 to the avoidance end position PE2. That is, the travel assistance device 6 sets the avoidance section S shorter than the avoidance section S originally set. The travel assistance device 6 generates a travel route TL for the avoidance control within the set avoidance section S.

As illustrated in FIG. 2B, in the present embodiment, when the moving object is likely to enter the avoidance section from the blind spot area on the oncoming lane, the avoidance end position is set to be a near side. This allows the driver to complete the avoidance control and return to the subject lane at an early timing, thereby reducing the driver's fear of the blind spot area. In addition, as the avoidance section is shortened, a curvature of the travel route set in the travelable area is increased. When the vehicle travels on the travel route having a large curvature, the vehicle decelerates and travels. Therefore, for example, even when the oncoming vehicle enters the buffer zone from the oncoming lane, the deceleration of the vehicle at the time of braking can be reduced.

FIG. 2C illustrates a situation t seconds after the situation of FIG. 2B in which the vehicle V1 is further close to the blind causing object OB on the oncoming lane L2. In FIG. 2C, the blind spot area BA is smaller than the blind spot area BA in the situation of FIG. 2B. Therefore, the moving object cannot be hidden in the blind spot area BA. In such a situation, the travel assistance device 6 sets the avoidance end position of the avoidance section S from the avoidance end position PE2 to the avoidance end position PE1. That is, the travel assistance device 6 resets the avoidance section S to the avoidance section S that was originally set. The travel assistance device 6 generates a travel route TL for the avoidance control within the set avoidance section S.

As illustrated in FIG. 2C, in the present embodiment, when the moving object is hidden in the blind spot area on the oncoming lane and the possibility that the moving object enters the avoidance section from the blind spot area is low, the driver's fear of the blind spot area is also reduced, and therefore, the distance of the avoidance section is set to be long with priority given to improving the traveling smoothness. As a result, the curvature of the travel route set in the travelable area is reduced, so that the subject vehicle does not need to be decelerated, and the traveling smoothness can be improved.

As described above, in the situations in which the subject vehicle executes the avoidance control, the blind spot area on the oncoming lane changes in time series. In the present embodiment, in response to the change in the blind spot area, the avoidance control that gives priority to dealing with the moving object on the oncoming lane that could enter the avoidance section and the avoidance control that prioritizes the smoothness of the travel are made compatible with one another.

In the present embodiment, the travel assistance device 6 realizes the avoidance control assistance by a processor 7. The processor 7 is a computer including a ROM72 in which a program is stored, a CPU71 that is an operation circuit for functioning as the travel assistance device 6 by executing the program stored in ROM72, and a RAM73 that functions as an accessible storage device. The processor 7 according to the present embodiment executes the respective functions by the cooperation of the software for realizing the above-described functions and the above-described hardware. The processor 7 includes, as functional blocks, a subject vehicle position estimation unit 100, a traveling boundary acquisition unit 101, a surrounding object acquisition unit 102, an object tracking unit 103, an obstacle determination unit 104, an avoidance determination unit 105, a boundary setting unit 106, an avoidance section setting unit 107, a blind spot determination unit 108, a blind spot risk calculation unit 109, an avoidance section updating unit 110, a moving object trajectory storage unit 111, and a vehicle control unit 112.

The subject vehicle position estimation unit 100 estimates a position and attitude of the subject vehicle on a map. The subject vehicle position estimation unit 100 estimates a present position and attitude of the subject vehicle on the map based on the map information acquired from the map DB2 and the position and attitude acquired from the subject vehicle information detection device 3. Although various methods have been proposed for the self-position estimation method, in the present invention, the method is not limited as long as the position and attitude of the subject vehicle can be estimated.

The traveling boundary acquisition unit acquires the lane information around the subject vehicle. For example, the traveling boundary acquisition unit 101 acquires the lane information of the subject lane on which the subject vehicle travels. In addition, the traveling boundary acquisition unit 101 acquires a boundary of the adjacent lane or the buffer zone in which the subject vehicle can travel in order to avoid the obstacle in a situation where the obstacle such as the parked vehicle is present in the subject lane. The traveling boundary acquisition unit 101 first acquires a road structure around the subject vehicle from the map DB2 based on the position and attitude of the subject vehicle estimated by the subject vehicle position estimation unit 100. Then, the traveling boundary acquisition unit 101 determines a presence or absence of the adjacent lane or the buffer zone of the subject lane, for example, based on the road structure. When the adjacent lane or the buffer zone is determined to be present, the traveling boundary acquisition unit 101 acquires the lane information including the lane boundary of the adjacent lane or the boundary of the buffer zone from the map DB2.

The surrounding object acquisition unit 102 acquires the surrounding object information about an object around the subject vehicle based on the detected information detected by the detection device 1. The surrounding object information includes the position, the attitude, and the velocity of the surrounding object. For example, the surrounding object acquisition unit 102 acquires the surrounding object information about the object located in the travel direction of the subject lane. The surrounding object acquisition unit 102 acquires the position information of the surrounding object based on the present position information of the subject vehicle and the relative position (distance/direction) between the subject vehicle and the surrounding object.

The object tracking unit 103 integrates the detection result of the object at current time and the detection result of the object at past time outputted from the detection device 1 in time series to track the position and attitude of the surrounding object, and estimates the velocity of the surrounding object from the position and attitude.

The obstacle determination unit 104 determines, based on the lane information and the surrounding object information, whether or not an obstacle that inhibits the subject vehicle from traveling in the subject lane is present. For example, the obstacle determination unit 104 determines whether or not an object that satisfies the following conditions is present on the subject lane, based on the positions of the left and right boundaries of the subject lane and the widthwise length of the subject lane included in the lane information of the subject lane, and the position of the surrounding object and the state of the surrounding object included in the surrounding object information. When the object that satisfies the conditions described later is present on the subject lane, the obstacle determination unit 104 identifies the object as the obstacle and determines that the obstacle is present on the subject lane. In addition, when there is no object satisfying the condition on the subject lane, the obstacle determination unit 104 determines that there is no obstacle on the subject lane. Then, when the obstacle is determined to be present, the obstacle determination unit 104 determines which side of the boundaries the obstacle is closer to in the left or right direction on the subject lane, based on the positions of the boundaries of the subject lane and the position of the obstacle. For example, the obstacle determination unit 104 determines the direction of the lane boundary closer to the obstacle among the left and right lane boundaries of the subject lane, as the direction closer to the obstacle on the subject lane. The obstacle determination unit 104 outputs a flag indicating that the obstacle is present, the left or right direction to which the obstacle is closer on the subject lane, and the distance from the position of the subject vehicle to the obstacle. When the obstacle is determined not to be present, the obstacle determination unit 104 outputs a flag indicating that the obstacle is not present.

Criteria for determining the presence or absence of the obstacle are, for example, that an object is present in the travel direction of the subject lane and the object is stopped. In addition, the determination condition of the presence or absence of the obstacle may satisfy the following three conditions. The first condition is that the object is present in the travel direction of the subject lane and the object is stopped, the second condition is that the object is closer to either the left or right from the center of the subject lane by a predetermined value or more, and the third condition is that a length obtained by subtracting the length in the width direction of the object from the length in the width direction of the subject lane is equal to or less than a predetermined length. The predetermined length is the width-wise length required for the subject vehicle to pass laterally through the object in the subject lane. For example, even when there is the stopped object in the travel direction of the subject lane and the subject vehicle cannot travel on the subject lane, the object may be a preceding vehicle waiting for a signal. Provided that the stopped object is closer to either the left or right on the subject lane, the obstacle determination unit 104 determines that the obstacle is present on the subject lane when the object is the parked vehicle.

The avoidance determination unit 105 determines, based on the lane information, whether or not the subject vehicle is allowed to avoid the obstacle by the steering control in the avoidance direction for avoiding the obstacle. For example, when the avoidance determination unit 105 determines whether or not the subject vehicle is allowed to avoid the obstacle based on the adjacent lane or the buffer zone acquired by the traveling boundary acquisition unit 101 when the obstacle determination unit 104 has determined that the obstacle is present. The avoidance determination unit 105 determines that the subject vehicle is allowed to avoid the obstacle in the avoidance direction when any one of the adjacent lane or the buffer zone where the subject vehicle can travel is present in the avoidance direction with respect to the subject lane. In addition, the avoidance determination unit 105 determines that the subject vehicle cannot avoid the obstacle when any one of the adjacent lane or the buffer zone where the subject vehicle can travel is not present in the avoidance direction of the subject lane.

In addition, the avoidance determination unit 105 may identify the direction opposite to the direction to which the obstacle is closer on the subject lane as the avoidance direction when the obstacle determination unit 104 has determined the obstacle is present. Then, the avoidance determination unit 105 determines whether or not the subject vehicle is allowed to avoid the obstacle using the direction opposite to the direction to which the obstacle is closer on the subject lane as the avoidance direction. The avoidance determination unit 105 determines that the subject vehicle is allowed to avoid the obstacle when any one of the adjacent lane or the buffer zone where the subject vehicle can travel is present in the opposite direction to which the obstacle is closer on the subject lane. The avoidance determination unit 105 determines that the subject vehicle cannot avoid the obstacle when any one of the adjacent lane or the buffer zone where the subject vehicle can travel is not present in the opposite direction to which the obstacle is closer on the subject lane.

For example, when the road on which the subject vehicle is traveling is a road with one lane on one side in face-to-face traffic and the buffer zone is present between the subject lane and the oncoming lane, assume the situation where the parked vehicle is close to left side on the subject lane and the buffer zone is present right side on the opposite side. The face-to-face traffic is a state in which the lanes are not separated for each reciprocating direction due to the road structure, such as the absence of the central separation zone on a road on which the passage is executed in the recipro- cating direction. In such a situation, the avoidance determi- nation unit 105 identifies the direction (right side with respect to the travel direction of the subject vehicle) opposite to the direction to which the parked vehicle is closer as the avoidance direction. Then, the avoidance determination unit 105 determines that the subject vehicle is allowed to avoid the obstacle because the buffer zone is present in the avoidance direction.

Further, for example, assume a situation in which the road on which the subject vehicle is traveling is a road connected to an intersection, and branches from one lane to a lane for straight travel and a lane for right turn in front of the intersection. In such a situation, for example, when a plu- rality of vehicles are stopped on a right turn lane for waiting for a signal, and a rear vehicle of the plurality of vehicles strays into a lane side for straight travel, the avoidance determination unit 105 identifies the left side direction as the avoidance direction with respect to the travel direction of the subject vehicle.

The boundary setting unit 106 sets the boundaries in the left-right direction of the travelable area where the subject vehicle can travel. In the present embodiment, the travel route is generated in the travelable area for the subject vehicle, and the subject vehicle travels along the travel route. For example, the boundary setting unit 106 sets the boundary in the left-right direction of the travelable area to the lane boundaries in the left-right direction of the subject lane. In addition, when the avoidance determination unit 105 has determined that the subject vehicle is allowed to avoid the obstacle on the subject lane, the boundary setting unit 106 sets the boundary in the avoidance direction side of the travelable area to the lane boundary in the avoidance direc- tion side of the adjacent lane boundary or the boundary in the avoidance direction side of the buffer zone. That is, when the boundary setting unit 106 executes the avoidance con- trol, the boundary setting unit 106 extends the boundary in the avoidance direction side of the travelable area to the boundary in the avoidance direction side of the adjacent lane or the buffer zone adjacent to the subject lane.

When the subject vehicle is determined to be allowed to avoid the obstacle, the boundary setting unit 106 first identifies a category of the lane in the avoidance direction side. The category is either the adjacent lane or the buffer zone. The adjacent lane includes the adjacent lane in the same direction as the travel direction of the subject lane and the adjacent lane (the oncoming lane) in the direction opposite to the travel direction of the subject lane. For example, when the road where the subject vehicle travels is a road having two lanes on each side where traffic is allowed in both directions, the adjacent lane of the subject lane is a lane in the same direction as the travel direction of the subject lane. Further, for example, when the road where the subject vehicle travels is a road having one lane on each side where traffic is allowed in both directions, the adjacent lane of the subject lane is the oncoming lane.

The boundary setting unit 106 then sets the boundary in the avoidance direction side of the travelable area to the lane boundary in the avoidance direction side of the adjacent lane when the adjacent lane is present in the avoidance direction side. In addition, when the buffer zone is present in the avoidance direction side, the boundary setting unit 106 sets the boundary in the avoidance direction side of the travel- able area to the boundary in the avoidance direction side of the buffer zone. As described above, in the present embodi- ment, the boundary setting unit 106 sets the boundary in the avoidance direction side of the travelable area to the bound- ary in the avoidance direction side of the adjacent lane or the buffer zone.

When the avoidance determination unit 105 has deter- mined that the subject vehicle is allowed to avoid the obstacle, the avoidance section setting unit 107 sets the avoidance section for executing the avoidance control including the steering control in the avoidance direction. The avoidance section is a section from the avoidance start position to the avoidance end position along the travel direction of the subject vehicle. The avoidance section corresponds to a length of the travelable area set to the adjacent lane or the buffer zone along the travel direction of the subject vehicle. The avoidance section setting unit 107 sets the avoidance end position of the avoidance section in response to a determination result by the blind spot deter- mination unit 108 as to whether or not the blind spot area is present on the oncoming lane. For example, when the blind spot area is determined to be present on the oncoming lane, the avoidance section setting unit 107 sets the avoidance end position at a near side in the travel direction close to the subject vehicle than when the blind spot area is determined not to be present.

First, a case where the blind spot area is determined to be not present will be described. The avoidance section setting unit 107 acquires the vehicle speed of the subject vehicle and multiplies the own vehicle speed by a predetermined first predetermined time to calculate a first avoidance distance. The first predetermined time is a time required for the avoidance control, for example, 4.0 seconds. The first pre- determined time may be an experimentally determined value. By setting the first predetermined time to 3.0 to 4.0 seconds, which is said to be the time required for lane change, the vehicle can smoothly change the lanes without decelerating. In FIGS. 2A to 2C, the first avoidance distance calculated here corresponds to the distance d.

The first avoidance distance will now be described here. The avoidance control is divided into two controls. The first control is a control for avoiding the obstacle, and the second control is a control for returning to the subject lane. In the first control, the subject vehicle changes the lane from the subject lane to the adjacent lane or the buffer zone in front of the obstacle. In the second control, the subject vehicle changes the lane from the adjacent lane or the buffer zone to the subject lane. In the present embodiment, the first avoid- ance distance is a distance required to execute the first control and the second control.

After the first avoidance distance is calculated, the avoid- ance section setting unit 107 sets the avoidance start position at the first avoidance distance away from the position of the obstacle in the direction opposite to the travel direction of the subject vehicle. Then, the avoidance section setting unit 107 sets the avoidance end position at the first avoidance distance away from the position of the obstacle in the travel direction of the subject vehicle. As described above, the avoidance section setting unit 107 sets the avoidance section when the blind spot area is determined not to be present on the oncoming lane by setting the avoidance start position and the avoidance end position.

The avoidance control may be divided into three controls. The first control is a control for avoiding the obstacle, the second control is a control for traveling on the side of the obstacle, and the third control is a control for returning to the subject lane. In the second control, the subject vehicle travels on the adjacent lane or the buffer zone and travels on the side of the obstacle. For example, when a plurality of parked vehicles located on the subject lane are present in parallel to the travel direction of the subject vehicle, the avoidance section setting unit 107 sets a section for traveling on the sides of the plurality of the parked vehicles as the second control. This is to avoid causing anxiety to the occupant of the subject vehicle about a case in which the subject vehicle could return to the subject lane side before the avoidance of the obstacles is completed when the obstacles are present in a long region on the subject lane.

Here, the avoidance section setting unit 107 sets a distance required for the second control as a second avoidance distance. Then, the avoidance section setting unit 107 sets a second avoidance section specified by the second avoidance distance along the travel direction of the subject vehicle starting from the position of the obstacle. The second avoidance distance is a preset length, for example, 10 m. The avoidance section setting unit 107 sets the second avoidance section with the position of the obstacle as the center point of the second avoidance section. For example, the avoidance section setting unit 107, based on the rear end of the obstacle, sets a starting position of the second avoidance section 5 m away from the rear end of the obstacle in the direction opposite to the travel direction of the subject vehicle, and an ending position of the second avoidance section 5 m away from the rear end of the obstacle in the travel direction of the subject vehicle.

Further, the avoidance section setting unit 107 sets the first avoidance section for each of the first control and the third control before and after the second avoidance section. For example, the avoidance section setting unit 107 sets the avoidance start position of the first avoidance section at the first avoidance distance away from the starting position of the second avoidance section in the direction opposite to the travel direction, and sets the avoidance end position of the first avoidance section at the first avoidance distance away from the end position of the second avoidance section in the travel direction. Here, the avoidance section is a section from the avoidance start position of the first avoidance section to the avoidance end position of the first avoidance section.

Figure 3:
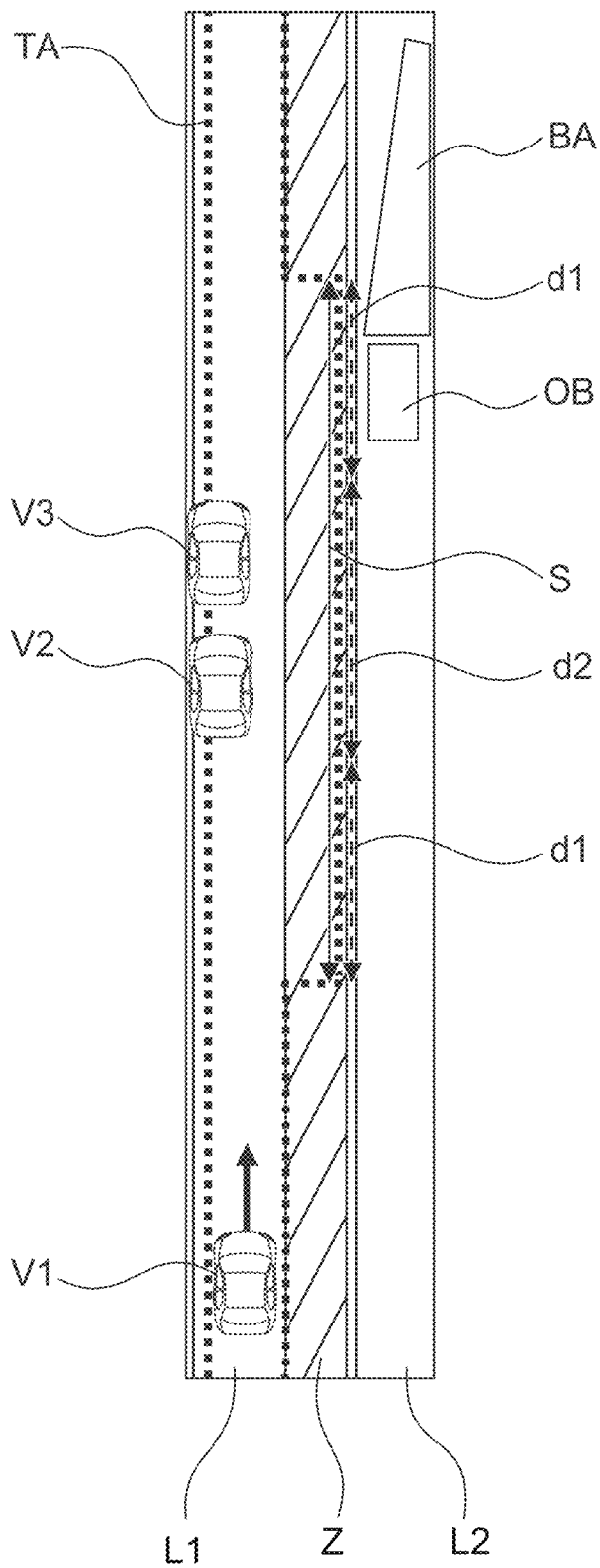
FIG. 3 is an exemplary situation in which the avoidance support control according to the present embodiment is executed.

FIG. 3 is a diagram illustrating the avoidance section when the second avoidance section is set. In FIG. 3, a parked vehicle V2 and a parked vehicle V3 are present on a subject lane L1 on which the vehicle V1 travels. In such cases, the second avoidance section for traveling on the side of the parked vehicles V2 and V3 are set. In FIG. 3, a section corresponding to a distance d2 is the second avoidance section for executing the second control. The section corresponding to a distance d1 is a first section for executing each of the first control and the third control. An avoidance section S is constituted of the second avoidance section and the first avoidance section before and after the second avoidance section.

Next, a case where the blind spot area is determined to be present will be described. When the blind spot area is determined to be present on the oncoming lane, the avoidance section setting unit 107 determines whether or not an entry possibility in which a moving object moving on the oncoming lane enters the avoidance section from the blind spot area is present, and sets the avoidance section in response to the determination result. When the entry possibility is determined to be present, the avoidance section setting unit 107 sets the avoidance end position to a further near side in the travel direction than when the entry possibility is determined not to be present. Also, when the entry possibility is determined not to be present, the avoidance section setting unit 107 sets the avoidance end position to a further far side in the travel direction than when the entry possibility is determined to be present.

For example, the avoidance section setting unit 107 sets the avoidance section according to the blind spot risk that quantitatively indicates the entry possibility. The blind spot risk indicates a possibility that the moving object moving on the oncoming lane enters the avoidance section from the blind spot area. A method of calculating the blind spot risk will be described later. In the present embodiment, when the blind spot risk is high, the avoidance section setting unit 107 sets the avoidance end position to the further near side in the travel direction than when the blind spot risk is low. When the blind spot risk is low, the avoidance section setting unit 107 sets the avoidance end position to the further far side in the travel direction than when the blind spot risk is high. In the present embodiment, the avoidance section is not limited to being set according to the blind spot risk. The avoidance section may be any other method as long as it is a method of setting the avoidance section according to the entry possibility. Hereinafter, the setting of the avoidance section according to the blind spot risk will be described in detail.

The avoidance section setting unit 107 corrects the first avoidance distance when the blind spot area is determined not to be present, according to the blind spot risk. First, the avoidance section setting unit 107 sets a subtraction time for subtracting the first predetermined time according to the blind spot risk. For example, the avoidance section setting unit 107 sets a value of the blind spot risk to the subtraction time. When the blind spot risk is one point, the subtraction time is set to one second.

The avoidance section setting unit 107 then subtracts the subtraction time from the first predetermined time. Then, the avoidance section setting unit 107 calculates the first avoidance distance by multiplying the subtracted first predetermined time by the vehicle speed of the subject vehicle. The avoidance section setting unit 107 sets the avoidance end position at the corrected first avoidance distance away from the position of the obstacle in the travel direction of the subject vehicle. That is, the avoidance end position is set to a position to the further near side than a position when the blind spot area is determined not to be present. In FIG. 2B, the first avoidance distance, which is subtracted according to the blind spot risk, corresponds to the distance d'.

When the blind spot risk is not present, that is, the blind spot risk is zero, the avoidance section setting unit 107 sets the subtraction time to zero seconds. Here, since the first avoidance distance is calculated by multiplying the first predetermined time by the vehicle speed of the subject vehicle, the avoidance section setting unit 107 sets the avoidance end position to the same position as a position when the blind spot area is determined not to be present. In the present embodiment, a subtraction time for subtracting the first predetermined time is set according to the blind spot risk. The present invention is not limited thereto, and a subtraction distance for subtracting the first avoidance distance may be set according to the blind spot risk.

As described above, the larger the blind spot risk, the shorter the first avoidance distance is set. Also, as described above, the avoidance section setting unit 107 sets the avoidance end position at the first avoidance distance away from the position of the obstacle in the travel direction of the subject vehicle. Therefore, when the blind spot risk is assumed to be large, that is, the entry possibility is high, the avoidance end position is set to the further near side in the travel direction closer to the subject vehicle than when the blind spot risk is small, that is, the entry possibility is low.

When the blind spot area is determined to be present, the avoidance section setting unit 107 may set the avoidance end position at the near side of the avoidance end position set when the blind spot area is determined not to be present.

In addition, the avoidance section setting unit 107 may set both the avoidance start position and the avoidance end position according to the blind spot risk. For example, when the subject vehicle is located at the near side of the obstacle and the blind spot risk is equal to or greater than the predetermined value, the avoidance section setting unit 107 sets both the avoidance start position and the avoidance end position according to the blind spot risk. When the blind spot risk is less than the predetermined value, the avoidance section setting unit 107 sets the avoidance end position based on the first avoidance distance subtracted according to the blind spot risk, while the avoidance section setting unit 107 calculates the first avoidance distance and sets the avoidance start position without subtracting according to the blind spot risk.

From the detection result of objects around the subject vehicle, the blind spot determination unit 108 determines whether or not the blind spot area, in which the blind causing object causes a blind spot from the subject vehicle, is present on the oncoming lane located in the avoidance direction with respect to the subject lane and opposed to the travel direction of the subject vehicle. First, the blind spot determination unit 108 detects, based on the surrounding object information, the blind causing object present on the oncoming lane within a range with respect to the avoidance section (hereinafter referred to as a blind spot evaluation range). When the blind causing object is present within the range, the blind spot evaluation range is a range in which a traveling trajectory of the moving object that avoids the blind causing object to the subject lane side would interfere with the avoidance section. For example, the blind spot evaluation range is the range corresponding to the avoidance section on the oncoming lane. The blind spot evaluation range may be determined experimentally. Then, the blind spot determination unit 108 determines whether or not the blind spot area as a blind spot from the subject vehicle by the detected blind causing object is generated. In the present embodiment, the blind spot determination unit 108 determines whether or not the blind spot area causing the blind spot from the subject vehicle is generated on the oncoming lane by the blind causing object in a range detectable by the detection device 1 at a constant cycle.

When the blind spot area is determined to be present on the oncoming lane, the blind spot determination unit 108 acquires blind spot information about the blind spot area on the oncoming lane. The blind spot information includes a size of the detected blind spot area, a size of the blind causing object, and a position of the blind causing object. For example, the blind spot determination unit 108 acquires at least one of a height, a width, and a length of the blind causing object as the size of the blind causing object. The width of the blind causing object is a length of the blind causing object in the width direction of the lane. The length of the blind causing object is a length of the blind causing object in the travel direction of the lane.

A known technique can be applied to a method for acquiring the presence or absence of the blind spot area, a range of the blind spot area, and the size of the blind spot area. The blind spot area assumes a range detectable by a LiDAR as a sensor that outputs point clouds. For this reason, an area where a point cloud is not generated on a HD map may be acquired as the blind spot area, for example, using a technique of occupancy grid map in the robotics field. The blind spot determination unit 108 acquires blind spot information at a constant cycle. That is, the blind spot determination unit 108 acquires the blind spot information of the blind spot area, which changes as the position of the subject vehicle moves relative to the blind causing object, in time series.

The blind spot risk calculation unit 109 calculates the blind spot risk based on the blind spot information of the blind spot area acquired by the blind spot determination unit 108. The blind spot risk is a value indicating a possibility that the moving object moving on the oncoming lane enters the avoidance section from the blind spot area. For example, the blind spot risk is a value of evaluation of the possibility that the moving object that possibly enters the avoidance section is hidden in the blind spot area, based on a status of the blind spot area. The higher the possibility, the higher the blind spot risk is calculated, and the lower the possibility, the lower the blind spot risk is calculated. When the blind spot area is determined to be present on the oncoming lane, for example, the blind spot risk calculation unit 109 determines whether or not the moving object possibly enters the avoidance section from the blind spot area.

When the moving object has been determined to possibly enter the avoidance section from the blind spot area, the blind spot risk calculation unit 109 calculates the blind spot risk to be high. When the moving object has been determined not to possibly enter the avoidance section from the blind spot area, the blind spot risk calculation unit 109 calculates the blind spot risk to be low. Whether or not the moving object possibly enters the avoidance section from the blind spot area is determined by evaluating elements constituting the blind spot area. The elements constituting the blind spot area include, for example, the size of the blind spot area, a distance between the blind causing object and the subject vehicle, the size of the blind causing object, and the traveling trajectory of the oncoming vehicle causing the blind spot area. Note that the blind spot risk calculation unit 109 may evaluate any one of the elements constituting the blind spot area to determine whether or not the moving object possibly enters the avoidance section from the blind spot area. The blind spot risk calculation unit 109 may evaluate each of the two or more elements and integrate the evaluation results.

The blind spot risk calculation unit 109 determines whether or not the blind spot area has a size enough to hide the oncoming vehicle. When the size of the blind spot area is equal to or larger than a predetermined value, the blind spot risk calculation unit 109 determines that the size is enough to hide the oncoming vehicle. When the size of the blind spot area is less than the predetermined value, the blind spot risk calculation unit 109 determines that the size is not enough to hide the oncoming vehicle. The predetermined value is, for example, the size of one vehicle. When the blind spot area has been determined to have the size enough to hide the oncoming vehicle, the blind spot risk calculation unit 109 adds an addition value to the blind spot risk. The addition value is, for example, 1.0 points. When the blind spot area has been determined not to have the size enough to hide the oncoming vehicle, the blind spot risk calculation unit 109 does not add the addition value to the blind spot risk.

The blind spot risk calculation unit 109 calculates a distance between the blind causing object and the subject vehicle based on the position of the blind causing object and the position of the subject vehicle. Then, the blind spot risk calculation unit 109 calculates the blind spot risk to be higher as the distance between the blind causing object and the subject vehicle decreases, and calculates the blind spot risk to be lower as the distance increases. For example, the blind spot risk calculation unit 109 determines whether or not the distance between the blind causing object and the subject vehicle is less than the predetermined value. When the distance between the blind causing object and the subject vehicle is less than the predetermined value, the blind spot risk calculation unit 109 adds the addition value to the blind spot risk. The addition value here is, for example, 0.5 points. When the distance between the blind causing object and the subject vehicle is not less than the predetermined value, the blind spot risk calculation unit 109 does not add the addition value to the blind spot risk.

In addition, the blind spot risk calculation unit 109 calculates the blind spot risk to be higher as the size of the blind causing object increase, and calculates the blind spot risk to be lower as the size of the blind causing object decreases. For example, the blind spot risk calculation unit 109 determines whether or not the size of the blind causing object is equal to or greater than a predetermined value. When the size of the blind causing object is determined to be equal to or greater than the predetermined value, the blind spot risk calculation unit 109 adds the addition value to the blind spot risk. When the blind spot area is caused by the blind causing object having a large size, it is often difficult to detect the moving object on the oncoming lane, and therefore the blind spot risk is set to be high. When the size of the blind causing object is determined not to be equal to or greater than the predetermined value, the blind spot risk calculation unit 109 does not add the addition value to the blind spot risk. Note that the blind spot risk calculation unit 109 may evaluate any one of the height, the width, and the length of the blind causing object as the size of the blind causing object. The blind spot risk calculation unit 109 may evaluate a combination of two or more elements of the height, the width, and the length of the blind causing object.

In the present embodiment, the addition value is a value larger than 0. The weights of the addition values may be changed for respective elements constituting the blind spot area. In the present embodiment, the blind spot risk is calculated by the addition value of the points. However, the present invention is not limited thereto, and the blind spot risk may be scalarly multiplied. For example, the blind spot risk may be multiplied by 1.2. The method is not limited to these methods, as long as the more possibly the moving object enters the avoidance section from the blind spot area, the higher the blind spot risk may be calculated.

Also, when the blind causing object is the oncoming vehicle traveling on the oncoming lane, the blind spot risk calculation unit 109 calculates the blind spot risk of the blind spot area on the oncoming lane caused by the oncoming vehicle. The blind spot risk calculation unit 109 determines, based on the surrounding object information, whether or not the oncoming vehicle is present on the oncoming lane and the blind spot area caused by the oncoming vehicle is present on the oncoming lane. When the oncoming vehicle is determined to be present on the oncoming lane and the blind spot area caused by the oncoming vehicle is present on the oncoming lane, the blind spot risk calculation unit 109 determines whether or not the oncoming vehicle has entered the avoidance section based on the traveling trajectory of the oncoming vehicle stored by the moving object trajectory storage unit 111. The blind spot risk calculation unit 109 compares the traveling trajectory of the oncoming vehicle in a past with the avoidance section and determines that the oncoming vehicle has entered the avoidance section when the traveling trajectory of the oncoming vehicle in the past passes over the adjacent lane or the buffer zone in contact with the subject lane within the avoidance section. When the traveling trajectory of the oncoming vehicle in the past has not passed over the adjacent lane or the buffer zone in contact with the subject lane within the avoidance section, the blind spot risk calculation unit 109 determines that the oncoming vehicle has not entered the avoidance section.

When the oncoming vehicle has been determined to have entered the avoidance section, the blind spot risk calculation unit 109 adds the addition value to the blind spot risk. The fact that the oncoming vehicle has entered the avoidance section means that the blind causing object is present on the oncoming lane. When another oncoming vehicle is present in the blind spot area on the oncoming lane, the other oncoming vehicle possibly enters the avoidance section similarly to a preceding oncoming vehicle to avoid the blind causing object. Therefore, the blind spot risk is calculated to be high. When the oncoming vehicle has been determined not to have entered the avoidance section, the blind spot risk calculation unit 109 does not add the addition value to the blind spot risk.

Further, the blind spot risk calculation unit 109 may calculate the blind spot risk to be higher as a possibility that a second oncoming vehicle traveling behind a first oncoming vehicle enters the avoidance section from the blind spot area caused by the first oncoming vehicle increases, and may calculate the blind spot risk to be lower as the possibility decreases. For example, the blind spot risk calculation unit 109 evaluates, as elements constituting the blind spot area, a size of the first oncoming vehicle as the blind causing object, a distance between the first oncoming vehicle and the subject vehicle, and a size of the blind spot area caused by the first oncoming vehicle, and calculates the blind spot risk indicating a possibility that the second oncoming vehicle enters the avoidance section from the blind spot area. A specific method of calculating the blind spot risk is the same as the above-described calculation method.

After the avoidance section is set by the avoidance section setting unit 107, the avoidance section updating unit 110 updates the avoidance section according to the blind spot risk at a predetermined cycle. For example, in the present embodiment, when the obstacle on the subject lane has been determined to be avoidable, the avoidance section setting unit 107 sets the avoidance section. Then, after the blind spot area is determined to be present, the avoidance section updating unit 110 updates the avoidance section according to the blind spot risk of the blind spot area at a constant cycle. Thus, in the present embodiment, the avoidance section can be updated according to change in the blind spot risk. The method of updating the avoidance section according to the blind spot risk is the same as the method of setting the avoidance section according to the blind spot risk.

The moving object trajectory storage unit 111 stores the positions of the other vehicle for each time series obtained from the object tracking unit 103 as the traveling trajectory. For example, the moving object trajectory storage unit 111 stores the positions of the moving object for each time series from the past to the present as the traveling trajectory that the moving object has traveled in the past.

The vehicle control unit 112 controls the subject vehicle such that the subject vehicle executes the avoidance control in the avoidance section. Specifically, the vehicle control unit 112 sets the travel route for the subject vehicle to travel from the avoidance start position to the avoidance end position of the avoidance section based on the travelable area set to the adjacent lane or the buffer zone in the avoidance section. The travel route is a route in which the subject vehicle starts the avoidance control from the avoidance start position, travels in the travelable area extended on the adjacent lane or the buffer zone, and reaches the avoidance end position. Note that the avoidance start position and the avoidance end position in the widthwise direction of the lane are, for example, positions on the center line of the subject lane. The vehicle control unit 112 calculates the target vehicle speed and a target steering angle for traveling along the set travel route, and generates a control signal for causing the subject vehicle to travel based on the calculated target vehicle speed and target steering angle. The generated control signals are outputted to the vehicle control device 5.

Figure 4:
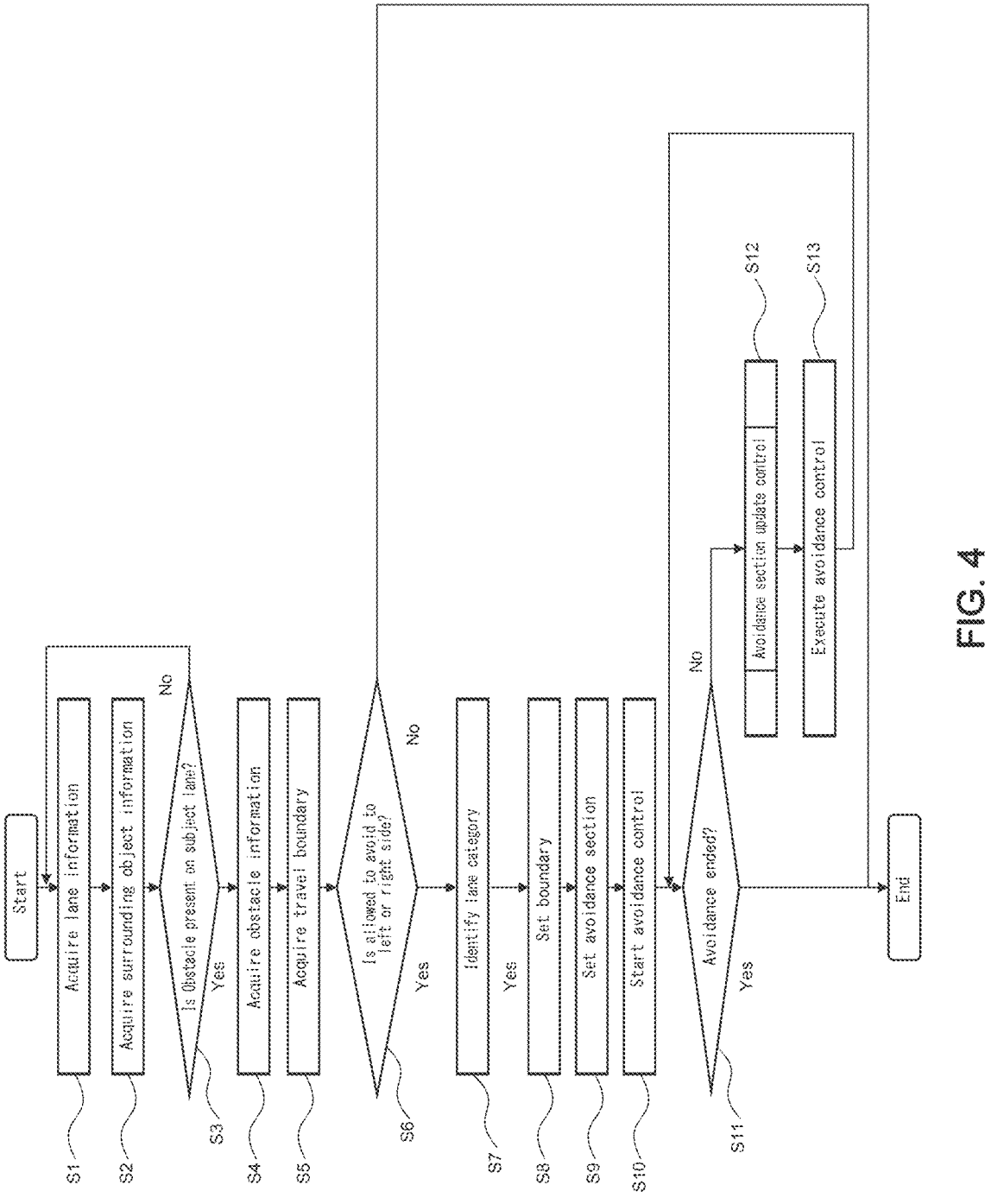
FIG. 4 is a flowchart illustrating a control flow for executing an avoidance assistance control according to the present embodiment.

Next, a control process according to the avoidance assistance control executed by the travel assistance device 6 will be described. FIG. 4 is a flow chart illustrating a control flow for executing the control process according to the avoidance assistance control in the travel assistance device 6. In the present embodiment, when the subject vehicle starts traveling, the control flow starts from Step S1. The travel assistance device 6 sets the travelable area in the subject lane where the subject vehicle travels and generates the travel route on the subject lane. The subject vehicle is controlled to travel through the travel route. In the present embodiment, when the avoidance control cannot be started and the avoidance assistance control flow ends, the travel control is switched to manual driving by the driver.

In Step S1, the processor 7 acquires the lane information around the subject vehicle. In Step S2, the processor 7 acquires the surrounding object information about an object around the subject vehicle. In Step S3, the processor 7 determines whether or not the obstacle is present in the subject lane based on the lane information and the surrounding object information. When determining that the obstacle is present, the processor 7 proceeds to Step S4. When determining that the obstacle is not present, the processor 7 returns to Step S1 and repeats the flow. That is, in the present embodiment, the processor 7 determines whether or not the obstacle is present on the subject lane at a constant cycle while the subject vehicle is traveling.

In Step S4, the processor 7 obtains obstacle information about the obstacle. The obstacle information includes either the left or right side direction of the subject lane where the obstacle is close and the distance from the position of the subject vehicle to the obstacle. In Step S5, the processor 7 acquires the travel boundary around the subject vehicle. For example, the processor 7 acquires the boundary of the adjacent lane or the buffer zone adjacent to the subject lane.

In Step S6, the processor 7 determines whether or not the subject vehicle is allowed to avoid the obstacle by the steering control in the avoidance direction in order to avoid the obstacle. For example, the processor 7 identifies the direction opposite to the direction in which the obstacle is close on the subject lane as the avoidance direction, based on either the left or right direction in which the obstacle is close included in the obstacle information. The processor 7 determines whether or not the adjacent lane or the buffer zone acquired by the traveling boundary acquisition unit 101 is present in the avoidance direction. When determining that the subject vehicle is allowed to avoid the obstacle, the processor 7 proceeds to Step S7. When determining that the subject vehicle cannot avoid the obstacle, the processor 7 ends the flow of the avoidance assistance control.

In Step S7, the processor 7 identifies a category of a lane in the avoidance direction side. That is, the processor 7 identifies whether the lane in the avoidance direction side is the adjacent lane or the buffer zone.

In Step S8, the processor 7 sets the boundary in the avoidance direction side of the travelable area to the boundary on the avoidance direction side of the adjacent lane or the buffer zone according to the category identified in Step S7. That is, when the adjacent lane is present in the avoidance direction side, the processor 7 sets the boundary in the avoidance direction side of the travelable area to the boundary in the avoidance direction side of the adjacent lane. When the buffer zone is present in the avoidance direction side, the processor 7 sets the boundary in the avoidance direction side of the travelable area to the boundary in the avoidance direction side of the buffer zone. In Step S9, the processor 7 sets the avoidance section specified by the avoidance start position and the avoidance end position. At the time of setting the avoidance section in Step S9, when the blind spot area is detected on the oncoming lane in the travel direction of the subject vehicle, the avoidance section may be set considering the blind spot area.

In Step S10, the processor 7 starts the avoidance control from the avoidance start position. Specifically, the processor 7 generates the travel route for executing the avoidance control in the travelable area, and calculates the target vehicle speed and the target steering angle for traveling along the travel route. Then, the processor 7 outputs the control signal for causing the vehicle to travel at the calculated target vehicle speed and target steering angle to the vehicle control device 5.

In Step S11, the processor 7 determines whether or not the avoidance control has ended. The processor 7 compares the position of the subject vehicle with the avoidance end position to determine whether or not the subject vehicle has reached the avoidance end position. When the subject vehicle has reached the avoidance end position, the processor 7 determines that the avoidance control has ended. When the subject vehicle has not reached the avoidance end position, the processor 7 determines that the avoidance control has not ended. When determining that the avoidance control has ended, the processor 7 ends the flow of the avoidance assistance control process. The subject vehicle returns to running along the subject lane. When determining that the avoidance control has not ended, the processor 7 proceeds to Step S12.

In Step S12, the processor 7 executes the avoidance section update control. A specific procedure of the avoidance section update control will be described later with reference to FIG. 4.

In Step S13, the processor 7 executes the avoidance control based on the avoidance end position set in Step S12. Specifically, the processor 7 generates the travel route according to the updated avoidance section, and calculates the target vehicle speed and the target steering angle for traveling along the travel route. Then, the processor 7 outputs the control signal for causing the vehicle to travel at the calculated target vehicle speed and target steering angle to the vehicle control device 5. Then, the processor 7 returns to Step S11 and repeats the flow. That is, in the present embodiment, after the avoidance control is started, the processor 7 determines whether or not the avoidance control has ended at a constant cycle. The processor 7 calculates the blind spot risk at that time until the avoidance control is determined not to have ended, and updates the avoidance section according to the blind spot risk.

Figure 5:
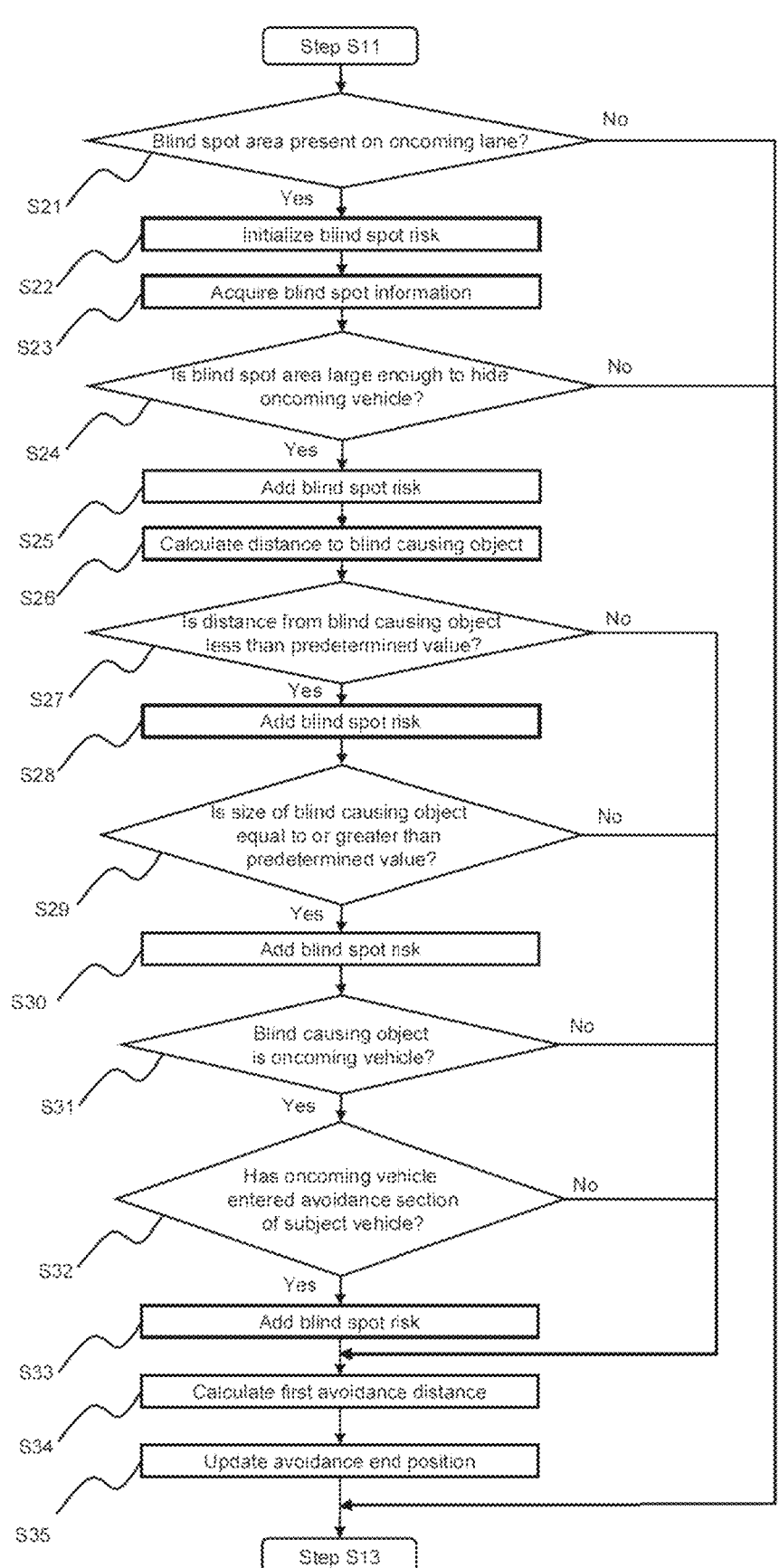
FIG. 5 is a flowchart illustrating a control flow for executing an avoidance section update control according to the present embodiment.

Next, a control process of the avoidance section update control executed by the travel assistance device 6 will be described. FIG. 5 is a flow chart illustrating a control flow for executing a control process of the avoidance section update control in the travel assistance device 6. In the present embodiment, when determining that the avoidance has not ended in Step S11 of FIG. 4, the processor 7 starts the control flow from step S21.

In Step S21, the processor 7 determines whether or not the blind spot area is present on the oncoming lane located in the avoidance direction with respect to the subject lane and opposed to the travel direction of the subject vehicle. When determining that the blind spot area is present on the oncoming lane, the processor 7 proceeds to Step S22. When determining that the blind spot area is not present on the oncoming lane, the processor 7 proceeds to Step S13 of FIG. 4 without executing the avoidance section update control.

In the present embodiment, after the avoidance control is started, it is determined whether or not the blind spot area is present on the oncoming lane, but this is not limited thereto. For example, before the avoidance section is set (Step S9), the presence or absence of the blind spot area may be determined, and the avoidance section may be set according to the blind spot area. After the avoidance section is set and before the avoidance control is started, the presence or absence of the blind spot area may be determined, and the avoidance section may be updated according to the blind spot area. When the presence or absence of the blind spot area cannot be determined by the detection result of the blind spot area due to a sensor failure or the like, the processor 7 may turn the control flow and switch the travel control to the manual driving of the driver.

In Step S22, the processor 7 initializes the blind spot risk by setting it to 0. In Step S23, the processor 7 acquires the blind spot information of the blind spot area caused by the blind causing object located adjacent to the avoidance section. The processor 7 identifies the blind causing object present in the blind spot evaluation range based on the surrounding object information, and acquires the blind spot information of the blind spot area caused by the blind causing object.

In Step S24, the processor 7 determines whether or not the blind spot area has the size large enough to hide the oncoming vehicle. When determining that the blind spot area is large enough to hide the oncoming vehicle, the processor 7 proceeds to Step S25. When determining that the blind spot area is not large enough to hide the oncoming vehicle, the processor 7 proceeds to the Step S13 of FIG. 4 without updating the avoidance section. In Step S25, the processor 7 adds the addition value to the initialized blind spot risk (0 points). The addition value is, for example, 1 point.

In Step S26, the processor 7 calculates the distance between the blind causing object and the subject vehicle. In Step S27, the processor 7 determines whether or not the distance between the blind causing object and the subject vehicle is less than a predetermined value. When determining that the distance between the blind causing object and the subject vehicle is less than the predetermined value, the processor 7 proceeds to Step S28. When determining that the distance between the blind causing object and the subject vehicle is not less than the predetermined value, the processor 7 proceeds to Step S34.

In Step S28, the processor 7 adds the addition value to the blind spot risk. The added value here is, for example, 0.5 points. In Step S29, the processor 7 determines whether or not the size of the blind causing object is equal to or greater than a predetermined value. When determining that the size of the blind causing object is equal to or greater than the predetermined value, the processor 7 proceeds to Step S30. When determining that the size of the blind causing object is not equal to or greater than the predetermined value, the processor 7 proceeds to Step S34. In Step S30, the processor 7 adds the addition value to the blind spot risk.

In Step S31, the processor 7 determines whether or not the blind causing object is the oncoming vehicle. That is, the processor 7 determines whether or not the oncoming vehicle is present on the oncoming lane and whether or not the blind spot area is caused by the oncoming vehicle. When determining that the blind causing object is the oncoming vehicle, the processor 7 proceeds to Step S32. When determining that the blind causing object is the oncoming vehicle, the processor 7 proceeds to Step S34.

In Step S32, the processor 7 determines, based on the traveling trajectory of the oncoming vehicle in the past stored by the moving object trajectory storage unit 111, whether or not the traveling trajectory of the oncoming vehicle to have been the traveling trajectory entering the avoidance section of the subject vehicle. When determining that the traveling trajectory of the oncoming vehicle has entered the avoidance section of the subject vehicle, the processor 7 proceeds to Step S33. When determining that the traveling trajectory has not entered the avoidance section of the subject vehicle, the processor 7 proceeds to Step S34. In Step S33, the processor 7 adds the addition value to the blind spot risk.

In Step S34, the processor 7 calculates the first avoidance distance according to the calculated blind spot risk. The processor 7 calculates the subtraction time of the first predetermined time according to the blind spot risk, and multiplies the first predetermined time subtracted by the subtraction time by the vehicle speed of the subject vehicle to calculate the first avoidance distance. In Step S35, the processor 7 updates the avoidance end position based on the calculated first avoidance distance. After the avoidance end position is updated, the processor 7 proceeds to the step S13 of FIG. 4.

As described above, this embodiment acquires lane information around a subject vehicle; acquires surrounding object information about an object around the subject vehicle; determines whether or not an obstacle hindering a travel of the subject vehicle on a subject lane where the subject vehicle travels is present, based on the lane information and the surrounding object information; determines whether or not the subject vehicle is allowed to avoid the obstacle by a steering control in an avoidance direction to avoid the obstacle based on the lane information when determining that the obstacle is present; determines whether or not a blind spot area as a blind spot from the subject vehicle is present on an oncoming lane opposed to a travel direction of the subject vehicle when determining that the subject vehicle is allowed to avoid the obstacle, the blind spot area being located in the avoidance direction with respect to the subject lane; sets an avoidance end position of an avoidance section to execute an avoidance control including the steering control in the avoidance direction according to a result of the determination of whether or not the blind spot area is present; and generates a travel route for the subject vehicle to travel from an avoidance start position to an avoidance end position of the avoidance section. Accordingly, when the travel route is generated to avoid the traveling avoidance region, the appropriate travel route can be generated according to the blind spot area as the blind spot from the subject vehicle on the oncoming lane in the travel direction of the subject vehicle.

Further, this embodiment determines whether or not an entry possibility is present in which a moving object moving on the oncoming lane enters the avoidance section from the blind spot area when determining that the blind spot area is present; sets the avoidance end position at a near side in the travel direction when determining that the entry possibility is present than when determining that the entry possibility is not present; and sets the avoidance end position at a far side in the travel direction when determining that the entry possibility is not present than when determining that the entry possibility is present. Accordingly, the avoidance end position for ending the avoidance control can be changed in the front-rear direction according to whether or not another moving object possibly enters the avoidance section from the blind spot. Therefore, it is possible to achieve both a scene that prioritizes dealing with the moving object that possibly enters the avoidance section and a scene that prioritizes the smoothness of the avoidance control.

Further, this embodiment sets the avoidance end position to the further near side in the travel direction as a distance between the obstacle and the blind spot area in the travel direction of the subject vehicle decreases; and sets the avoidance end position to the further far side in the travel direction as the distance between the obstacle and the blind spot area in the travel direction of the subject vehicle increases. This creates a trajectory that returns to the subject lane as soon as possible after avoiding the obstacle of the subject vehicle because the avoidance end position is set to the further near side as the possibility that the other moving object enters the avoidance section increases. In addition, since the curvature of the travel route for avoiding the obstacle is increased, the subject vehicle will travel while decelerating. Thus, the deceleration when the moving object enters the avoidance section can be reduced.

Further, this embodiment stores a previously traveled traveling trajectory of the moving object in a past; determines whether or not a first moving object has previously entered the avoidance section in a past based on the stored traveling trajectory of the first moving object; sets the avoidance end position to the further near side in the travel direction as an entry possibility in which a second moving object enters the avoidance section from the blind spot area caused by the first moving object increases when determining that the first moving object has entered the avoidance section in the past; and sets the avoidance end position to the further far side in the travel direction as the entry possibility decreases. As a result, since the moving object on the oncoming lane has a trajectory that enters the subject lane side, it is possible to set the avoidance section according to the entry possibility on the assumption that the blind causing object that causes a blind spot is present on the oncoming lane. For example, even in a situation where the moving object on the oncoming lane causes a blind spot behind the moving object from the subject vehicle and the blind causing object on the oncoming lane is undetectable, it is possible to determine that the blind causing object is present on the oncoming lane using the trajectory of the moving object on the oncoming lane and set the avoidance section according to the entry possibility.

Further, this embodiment acquires at least one of a height, a width, and a length of a blind causing object causing the blind spot area as a size of the blind causing object; sets the avoidance end position to the further near side in the travel direction as the size of the blind causing object increases; and sets the avoidance end position to the further far side in the travel direction as the size of the blind causing object decreases. This makes it possible to reflect the entry possibility according to the size of the blind causing object causing the blind spot. For example, consider a situation where the blind causing object having a height, such as a truck, is parked on the oncoming lane side. At this time, when the moving object is present behind the blind causing object, the moving object possibly interfere with the subject vehicle during the avoidance control of the subject vehicle because the moving object and the subject vehicle are difficult to detect one another. Therefore, by setting the entry possibility to be large according to the size of the blind causing object under such circumstances, the vehicle can travel dealing with the moving object entering the avoidance section.

Further, this embodiment determines whether or not the entry possibility is present when determining that the blind spot area is present; calculates a blind spot risk to be high, the blind spot risk indicating a possibility of the moving object entering the avoidance section from the blind spot area when determining that the entry possibility is present; calculates the blind spot risk to be low when determining that the entry possibility is not present, and sets the avoidance end position to the further near side in the travel direction when the blind spot risk is high than when the blind spot risk is low; and sets the avoidance end position to the further far side in the travel direction when the blind spot risk is low than when the blind spot risk is high. This makes it possible to increase the blind spot risk when there is a possibility that the other moving object enters the avoidance section from the blind spot, and to lower the blind spot risk when there is no possibility, so as to set the avoidance end position to end the avoidance control according to the blind spot risk. Therefore, it is possible to achieve both the scene that prioritizes dealing with the moving object that possibly enters the avoidance section and the scene that prioritizes the smoothness of the avoidance control.

Further, this embodiment acquires a vehicle speed of the subject vehicle when determining that the blind spot area is not present; calculates a first avoidance distance based on the vehicle speed and a first predetermined time required for the avoidance control; sets an avoidance start position where the avoidance section starts at the first avoidance distance away from a position of the obstacle in a direction opposite to the travel direction; and sets the avoidance end position at the first avoidance distance away from the position of the obstacle in the travel direction. This makes it possible to generate the smooth traveling trajectory at the time of the avoidance control and drive the subject vehicle.

Further, this embodiment sets a second avoidance section specified by a second avoidance distance for the subject vehicle to travel on a side of the obstacle starting from the position of the obstacle; sets the avoidance start position of the avoidance section at the first avoidance distance away from a starting position of the second avoidance section in a direction opposite to the travel direction; and sets the avoidance end position of the avoidance section at the first avoidance distance away from an end position of the second
avoidance distance in the travel direction. As a result, since
the obstacle on the subject lane can be used as a starting
point to set the avoidance section, the subject vehicle can
smoothly avoid the obstacle and pass therethrough.

Further, this embodiment calculates a blind spot risk, the
blind spot risk indicating a possibility that the moving object
traveling on the oncoming lane enters the avoidance section
from the blind spot area when determining that the blind spot
area is present, and corrects the first avoidance distance
according to the blind spot risk; and sets the avoidance end
position at the corrected first avoidance distance from the
position of the obstacle in the travel direction. Accordingly,
by updating the first avoidance distance according to the
blind spot risk, it is possible to achieve both the scene that
prioritizes dealing with the moving object that possibly
enters the avoidance section and the scene that prioritizes the
smoothness of the avoidance control. For example, the
larger the blind spot risk, the shorter the avoidance section,
and the avoidance control that prioritizes dealing with the
moving object that possibly enters the avoidance section is
executed. On the other hand, the smaller the blind spot risk,
the longer the avoidance section becomes, and the avoidance
control prioritizing the smoothness is executed.

Further, this embodiment determines that the subject
vehicle is allowed to avoid the obstacle in the avoidance
direction when any one of an adjacent lane or a buffer zone
is present in the avoidance direction with respect to the
subject lane. This allows the subject vehicle to avoid the
obstacle with enough clearance between the subject vehicle
and the obstacle to execute the avoidance control when the
adjacent lane or the buffer zone is present in contact with the
subject lane.

Further, this embodiment determines which side of the
subject lane the obstacle is closer to in the left or right
direction; and determines whether or not the subject vehicle
is allowed to avoid the obstacle in a direction opposite to the
direction closer to the obstacle on the subject lane as the
avoidance direction. This allows the subject vehicle to avoid
in the necessary direction according to the position the
obstacle on the subject lane. For example, when the parked
vehicle is close to the left side of the subject lane, the subject
vehicle can avoid in the right side.

Further, this embodiment sets a boundary of a travelable
area where the subject vehicle is allowed to travel as a lane
boundary of the subject lane; and sets a boundary in the
avoidance direction side of the travelable area as a lane
boundary in the avoidance direction side of the adjacent lane
while the adjacent lane is present in the avoidance direction
when determining the subject vehicle is allowed to avoid the
obstacle. Thus, in a case where the adjacent lane of the
subject lane is present when the boundary of the travelable
area for the subject vehicle to avoid is corrected, the
boundary of the travelable area can be set to the lane
boundary of the avoidance direction side of the oncoming
lane of the subject lane. For example, in left-hand traffic, in
a situation where it avoids to the right side of the parked
vehicle, setting the boundary of the travelable area to the
lane on the right side of the oncoming lane of the subject
lane allows enough clearance with the obstacle to avoid the
obstacle.

Further, this embodiment sets a boundary of a travelable
area where the subject vehicle is allowed to travel as a lane
boundary of the subject lane; and sets a boundary in the
avoidance direction side of the travelable area as a boundary
in the avoidance direction side of the buffer zone while the
buffer zone is present in the avoidance direction when determining the subject vehicle is allowed to avoid the
obstacle. This allows the boundary of the travelable area to
be set to the boundary of the buffer zone. Therefore, even
when the obstacle is present in the subject lane, the travel
route for avoidance can be generated on the buffer zone and
allow the subject vehicle to pass therethrough.

It should be appreciated that the embodiments explained
heretofore are described to facilitate understanding of the
present invention and are not described to limit the present
invention. It is therefore intended that the elements disclosed
in the above embodiments include all design changes and
equivalents to fall within the technical scope of the present
invention.

In the present embodiment, the blind spot risk is calcu-
lated and the avoidance end position of the avoidance
section is set according to the blind spot risk, but it is not
necessarily required to calculate the blind spot area, for
example, the avoidance end position may be set according to
the detection result of the presence or absence of the blind
spot area.

DESCRIPTION OF REFERENCE NUMERALS

6 Travel assistance device
7 Processor
100 Subject vehicle position estimation unit
101 Traveling boundary acquisition unit
102 Surrounding object acquisition unit
103 Object tracking unit
104 Obstacle determination unit
105 Avoidance determination unit
106 Boundary setting unit
107 Avoidance section setting unit
108 Blind spot determination unit
109 Blind spot risk calculation unit
110 Avoidance section updating unit
111 Moving object trajectory storage unit
112 Vehicle control unit
The invention claimed is:
1. A travel assistance method executed by a processor,
wherein the processor:
  acquires lane information around a subject vehicle;
  acquires surrounding object information about an object
    around the subject vehicle;
  determines that an obstacle hindering a travel of the
    subject vehicle on a subject lane where the subject
    vehicle travels is present, based on the lane information
    and the surrounding object information;
  determines that the subject vehicle is allowed to avoid the
    obstacle by a steering control to an oncoming lane
    located in an avoidance direction to avoid the obstacle
    and opposed to a travel direction of the subject vehicle,
    based on the lane information in response to determin-
    ing that the obstacle is present;
  determines that a blind spot area as a blind spot from the
    subject vehicle is present on an oncoming lane;
  determines that a blind spot risk is present, the blind spot
    risk being that a moving object moving on the oncom-
    ing lane enters from the blind spot area to an avoidance
    section for the subject vehicle to execute an avoidance
    control including the steering control;
  sets an avoidance end position of the avoidance section;
  generates a travel route for the subject vehicle to travel
    from an avoidance start position to the avoidance end
    position of the avoidance section, wherein the avoid-
    ance end position set in response to determining that
    the subject vehicle is allowed to avoid the obstacle and that the blind spot risk is present is located closer to the subject vehicle in the travel direction than an avoidance end position set in response to determining that the subject vehicle is allowed to avoid the obstacle in absence of the blind spot risk; and controls travel of the subject vehicle along the travel route.

2. The travel assistance method according to claim 1, wherein the processor:

sets the avoidance end position to a further near side in the travel direction as a distance between the obstacle and the blind spot area in the travel direction of the subject vehicle decreases; and sets the avoidance end position to a further far side in the travel direction as the distance between the obstacle and the blind spot area in the travel direction of the subject vehicle increases.

3. The travel assistance method according to claim 1, wherein the processor:

stores a previously traveled traveling trajectory of the moving object in a past;

determines that a first moving object has previously entered the avoidance section in a past based on the stored traveling trajectory of the first moving object;

in response to determining that the first moving object have entered the avoidance section in the past, sets the avoidance end position to a further near side in the travel direction as a blind spot risk in which a second moving object enters the avoidance section from the blind spot area caused by the first moving object increases; and sets the avoidance end position to a further far side in the travel direction as the blind spot risk decreases.

4. The travel assistance method according to claim 1, wherein the processor:

acquires at least one of a height, a width, and a length of a blind causing object causing the blind spot area as a size of the blind causing object;

sets the avoidance end position to a further near side in the travel direction as the size of the blind causing object increases; and sets the avoidance end position to a further far side in the travel direction as the size of the blind causing object decreases.

5. The travel assistance method according to claim 1, wherein the processor:

sets the avoidance end position to a further near side in the travel direction as the blind spot risk increases; and sets the avoidance end position to a further far side in the travel direction as the blind spot risk decreases.

6. The travel assistance method according to claim 1, wherein the processor:

acquires a vehicle speed of the subject vehicle in absence of the blind spot area;

calculates a first avoidance distance based on the vehicle speed and a first predetermined time required for the avoidance control;

sets an avoidance start position where the avoidance section starts at the first avoidance distance away from a position of the obstacle in a direction opposite to the travel direction; and sets the avoidance end position at the first avoidance distance away from the position of the obstacle in the travel direction.

7. The travel assistance method according to claim 6, wherein the processor:

sets a second avoidance section specified by a second avoidance distance for the subject vehicle to travel on a side of the obstacle starting from the position of the obstacle;

sets the avoidance start position of the avoidance section at the first avoidance distance away from a starting position of the second avoidance section in a direction opposite to the travel direction; and sets the avoidance end position of the avoidance section at the first avoidance distance away from an end position of the second avoidance section in the travel direction.

8. The travel assistance method according to claim 6, wherein the processor:

corrects the first avoidance distance according to the blind spot risk; and sets the avoidance end position at the corrected first avoidance distance away from the position of the obstacle in the travel direction.

9. The travel assistance method according to claim 1, wherein the processor determines that the subject vehicle is allowed to avoid the obstacle in the avoidance direction in response to determining that any one of an adjacent lane or a buffer zone is present in the avoidance direction with respect to the subject lane.

10. The travel assistance method according to claim 1, wherein the processor:

determines that the obstacle is closer to a left or right side of the subject vehicle on the subject lane; and determines that the subject vehicle is allowed to avoid the obstacle in the right side in response to determining that the obstacle is closer to the left side; and determines that the subject vehicle is allowed to avoid the obstacle in the left side in response to determining that the obstacle is closer to the right side.

11. The travel assistance method according to claim 9, wherein the processor:

sets a boundary of a travelable area where the subject vehicle is allowed to travel as a lane boundary of the subject lane; and sets a boundary in an avoidance direction side of the travelable area as a lane boundary in the avoidance direction side of the adjacent lane while the adjacent lane is present in the avoidance direction in response to determining that the subject vehicle is allowed to avoid the obstacle.

12. The travel assistance method according to claim 9, wherein the processor:

sets a boundary of a travelable area where the subject vehicle is allowed to travel as a lane boundary of the subject lane; and sets a boundary in an avoidance direction side of the travelable area as a boundary in the avoidance direction side of the buffer zone while the buffer zone is present in the avoidance direction in response to determining that the subject vehicle is allowed to avoid the obstacle.

13. A travel assistance device comprising a controller configured to:

acquire lane information around a subject vehicle;

acquire surrounding object information about an object around the subject vehicle;

determine that an obstacle hindering a travel of the subject vehicle on a subject lane where the subject vehicle travels is present, based on the lane information and the surrounding object information;

determine that the subject vehicle is allowed to avoid the obstacle by a steering control to an oncoming lane located in an avoidance direction to avoid the obstacle and opposed to a travel direction of the subject vehicle based on the lane information;

determine that a blind spot area as a blind spot from the subject vehicle, is present on an oncoming lane;

determine that a blind spot risk is present, the blind spot risk being that a moving object moving on the oncoming lane enters from the blind spot area to an avoidance section for the subject vehicle to execute an avoidance control including the steering control;

set an avoidance with-end position of the avoidance section;

generate a travel route for the subject vehicle to travel from an avoidance start position to the avoidance end position of the avoidance section, wherein the avoidance end position set in response to determining that the subject vehicle is allowed to avoid the obstacle and that the blind spot risk is present is located closer to the subject vehicle in the travel direction that the avoidance end position set in response to determining that the subject vehicle is allowed to avoid the obstacle in absence of the blind spot risk; and controls travel of the subject vehicle along the travel route.

* * * * *